(12) United States Patent
Huynh

(10) Patent No.: US 10,897,968 B2
(45) Date of Patent: Jan. 26, 2021

(54) JEWELRY HEAD FORMED OF FERRIMAGNETIC MATERIAL FOR USE WITH NEAR FIELD COMMUNICATION

(71) Applicant: Chi Huynh, San Dimas, CA (US)

(72) Inventor: Chi Huynh, San Dimas, CA (US)

(*) Notice: Subject to any disclaimer, the term of this patent is extended or adjusted under 35 U.S.C. 154(b) by 197 days.

(21) Appl. No.: 16/303,512

(22) PCT Filed: Aug. 7, 2018

(86) PCT No.: PCT/US2018/045665
§ 371 (c)(1),
(2) Date: Nov. 20, 2018

(87) PCT Pub. No.: WO2019/032617
PCT Pub. Date: Feb. 14, 2019

(65) Prior Publication Data
US 2019/0387849 A1    Dec. 26, 2019

Related U.S. Application Data

(60) Provisional application No. 62/542,219, filed on Aug. 7, 2017.

(51) Int. Cl.
*A44C 17/02* (2006.01)
*G06K 19/077* (2006.01)
*A44C 9/00* (2006.01)

(52) U.S. Cl.
CPC ............ *A44C 17/02* (2013.01); *A44C 9/0053* (2013.01); *G06K 19/07758* (2013.01); *G06K 19/07777* (2013.01)

(58) Field of Classification Search
CPC ..... A44C 9/0053; A44C 17/005; A44C 17/02; A44C 25/001; A44C 25/007; A44C 17/006; A44C 17/007; A44C 17/008; A44C 17/0208; A44C 17/0216; H04W 4/008; G06K 19/07762; G06K 19/07758; G06K 19/07777
USPC .......................... 63/1.13, 1.11, 4, 21, 23, 40
See application file for complete search history.

(56) References Cited

U.S. PATENT DOCUMENTS

| | | | |
|---|---|---|---|
| 9,456,063 B2 | 9/2016 | Mercando et al. | |
| 9,489,612 B2 * | 11/2016 | Boulby | A44C 5/0015 |
| 2012/0242481 A1 | 9/2012 | Gemandt et al. | |
| 2013/0234899 A1 | 9/2013 | Pope et al. | |
| 2014/0102136 A1 | 4/2014 | Warren | |
| 2014/0292477 A1 | 10/2014 | Ahmadloo | |
| 2015/0220109 A1 | 8/2015 | von Badinski et al. | |
| 2016/0110639 A1 | 4/2016 | Finn et al. | |
| 2016/0112097 A1 | 4/2016 | Huynh | |
| 2016/0196487 A1 | 7/2016 | Huynh | |

OTHER PUBLICATIONS

PCT/US2018/045665 International Search Report and Written Opinion dated Oct. 24, 2018.

* cited by examiner

*Primary Examiner* — Jack W Lavinder
(74) *Attorney, Agent, or Firm* — Wagenknecht IP Law Group, PC

(57) ABSTRACT

A jewelry head for mounting a precious or semi-precious gem to an article of jewelry, the jewelry head having a ferrimagnetic body with an inner cavity configured to accept a precious or semi-precious gem; and a near field communication circuit having a near field communication chip electrically connected to an antenna, where the antenna is wrapped around and against the ferrimagnetic body.

11 Claims, 4 Drawing Sheets

JEWELRY HEAD FORMED OF FERRIMAGNETIC MATERIAL FOR USE WITH NEAR FIELD COMMUNICATION

CROSS REFERENCE TO RELATED APPLICATIONS

This application is a US national phase application under 35 USC § 371 of international patent application no. PCT/US2018/045665, filed Aug. 7, 2018, which itself claims benefit of priority to U.S. provisional application 62/542,219, filed Aug. 7, 2017. Each of the applications referred to in this paragraph are incorporated herein by reference in their entireties.

TECHNICAL FIELD

The invention relates to jewelry and more specifically to a jewelry head for mounting a precious or semi-precious gem and more specifically to a jewelry head for receiving a gem and having a ferrimagnetic body and a near field communication circuit, where the antenna from the circuit is wrapped around a surface of the body.

BACKGROUND OF THE INVENTION

Jewelry is often given at special occasions, such as birthdays, anniversaries, vacations, and other memorable life events. Those that receive such gifts often wish to preserve and relive these memories; however, the moment itself is often not recorded or the recording is lost among numerous other recordings, thereby losing its intended close association with the jewelry.

Radio frequency identification (RFID) is a technology commonly used for tracking purposes and inventory management, often replacing bar codes. RFID tags contain an antenna and memory that stores data. Identifying or reading the data is accomplished using an RFID reader. RFID tags are widespread in the retail industry.

Near field communication (NFC) is a more finely honed version of RFID. It conventionally operates within a maximum range of up to about 4-10 cm and can operate in one- or two-way communication. NFC communication involves the modulation of a magnetic field between two devices, commonly referred to as an initiator and target. The initiator generates the RF field and the target modulates the field using power from the initiator. NFC-enabled features are now commonly integrated into smart phones.

Among the challenges of adapting near field communication to jewelry is that jewelry is often formed from highly electrically conductive materials, such as gold and silver, which can interfere with communication. Another challenge is that as gemstones become more expensive, they also become smaller in size. Therefore, the NFC antennas must also become smaller. However, as the diameter of the NFC antenna is reduced so does the range.

Therefore there is a need to develop new articles of jewelry that reduce the size of the near field communication antenna while maintaining an acceptable near field communication range and which can be used with materials commonly used in the jewelry industry.

SUMMARY OF THE INVENTION

The invention addresses the above needs and provides related benefits. This is accomplished in one aspect of the invention, by the development of a jewelry head for mounting a precious or semi-precious gem to an article of jewelry, the jewelry head having a ferrimagnetic body with an inner cavity configured to accept a precious or semi-precious gem; and a near field communication circuit having a near field communication chip electrically connected to an antenna, where the antenna is wrapped around and against the ferrimagnetic body.

Non-limiting examples of suitable gems for acceptance include one or more selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

In some embodiments, the body is configured as a continuous wall. When a gem is recessed within the body, the continuous wall surrounds a perimeter of the recessed portion of the gem. In further embodiments, the antenna spirally wraps along an outside height of the wall. In some embodiments, the body is configured as a tapered sleeve having a through bore along its longitudinal axis. Likewise, the antenna can spirally wrap along an outside height of the tapered sleeve.

Preferably the body is formed by ferrite, and the antenna contacts the ferrite. The body can have an outer layer or coating covering the near field communication circuit and body. Preferably the outer layer is electrically non-conductive. Non-limiting examples of suitable materials for the outer layer include epoxy, ceramic and plastic.

The jewelry head is typically affixed to an article of jewelry to be worn as conventional jewelry. As such, in a related aspect of the invention, a jewelry item is provide, which includes one or more jewelry heads affixed to an article of jewelry. In further embodiments, the one or more jewelry heads each have one or more gems mounted in one or more cavities. In still further embodiments, the jewelry head is shaped complimentary to a receiving member forming part of the article of jewelry.

BRIEF DESCRIPTION OF THE DRAWINGS

Embodiments of the invention can be better understood with reference to the following drawings, which form part of the specification and represent preferred embodiments. The components in the drawings are not necessarily to scale, the emphasis instead being placed upon illustrating the principles of the invention. And, in the drawings, like reference numerals designate corresponding parts throughout the several views.

FIG. 1B is an exploded view of FIG. 1A showing the concave/tapered configuration of the body 12 to securely seat the gem 30. FIG. 1C is a bottom view of the pendent 100A of FIG. 1A showing a gap 114A within the receiving member 112A to prevent a continuous conductive loop around the antenna 22.

FIG. 2B is an exploded view of FIG. 2A showing the concave/tapered configuration of the body 12 to securely seat the gem 30 and shows the outer contour of the jewelry head 10 is substantially complementary to a receiving member 112B on the article of jewelry 110B for easy placement.

FIG. 3B is a bottom view of the jewelry head 10 of FIG. 3A showing a through bore 16 that extends along the longitudinal extent of the jewelry body 12. Also shown is the NFC chip 24 electrically connected to the NFC antenna 22. FIG. 3C is a cross section of the jewelry head 10 showing the inner cavity 14 and the NFC antenna 22 wrapped around the outside surface of the body 12. The NFC chip 24 is also shown. FIG. 3D is a side elevational view the jewelry head 10 showing the electrical connection of the NFC chip 24 to opposing ends of the NFC antenna 22.

DETAILED DESCRIPTION OF PREFERRED EMBODIMENTS

For clarity of disclosure, and not by way of limitation, the invention is discussed according to different detailed embodiments; however, the skilled artisan will recognize through the guidance herein that features of one embodiment can be combined with other embodiments and therefore such combinations are within the intended scope of the invention.

Figure 1A:
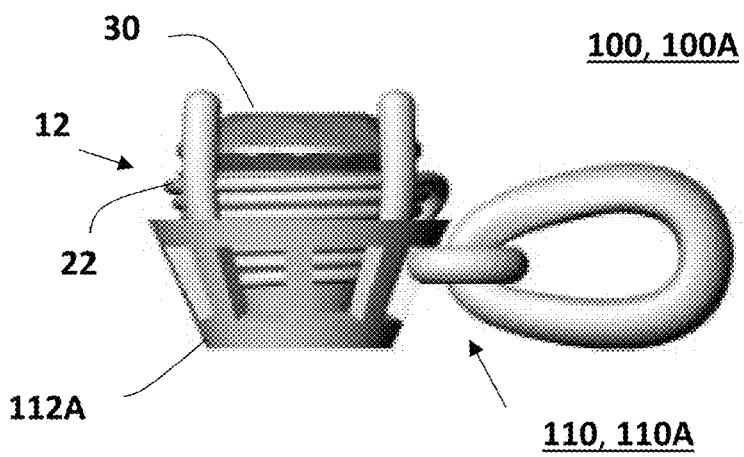
FIGS. 1A-C depict a pendant 100A having a gem 30 affixed to the body 12 of a jewelry head 10. A near field communication antenna 22 spirally wraps around and against the body 12.
Figure 1B:
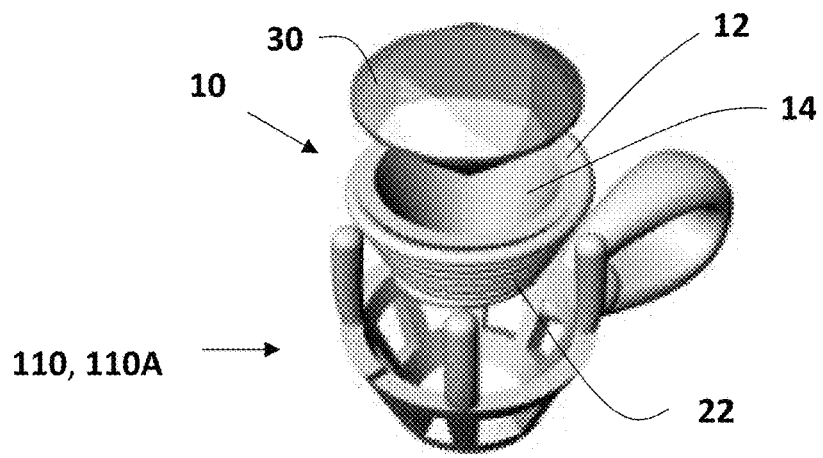
Figure 1C:
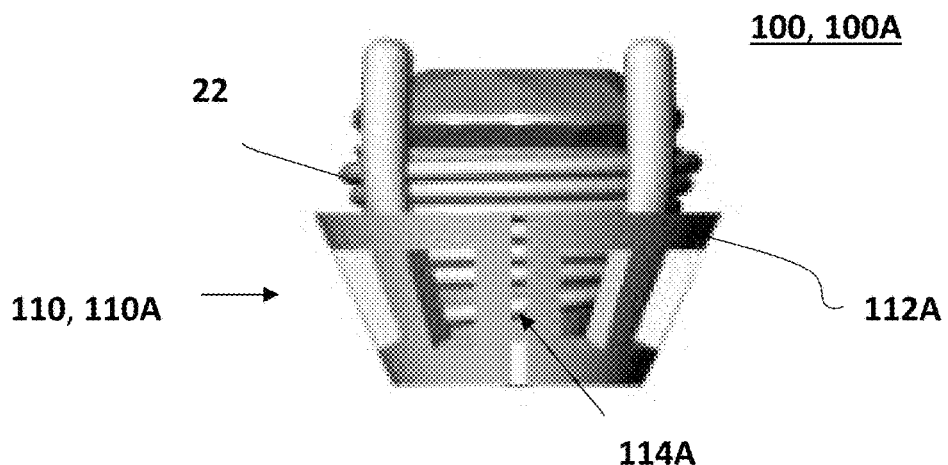

Beginning at FIGS. 1A-C, a jewelry item 100 in the form of a pendent 100A displaying a precious gem 30 embodied as a blue topaz is shown. The pendant 110A includes a receiving member 112A configured to receive a jewelry head 10. As such, the inner contour of the receiving member 112A and outer contour of the jewelry head 10 are shown substantially complementary in shape. By providing a jewelry head 10 separate from the article of jewelry 110, jewelry heads 10 with substantially different inner diameters but with substantially the same outer diameters and/or contours can be formed to couple a variety of different sized gems 30 to a same article of jewelry 110. Further, one of ordinary skill in the art to which the invention belongs would recognize that while the jewelry head 10 is shown with only a single gem 30, the jewelry head 10 could be formed to accept a plurality of gems 30.

Figure 2A:
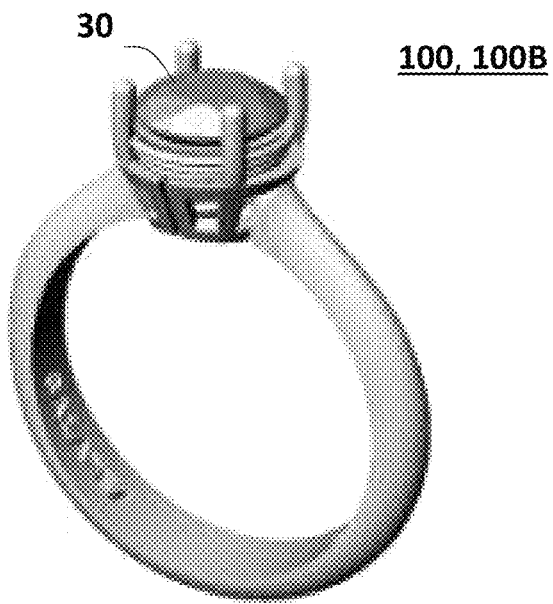
FIGS. 2A-B depict a ring 100B having a gem 30 affixed to the body 12 of a jewelry head 10.
Figure 2B:
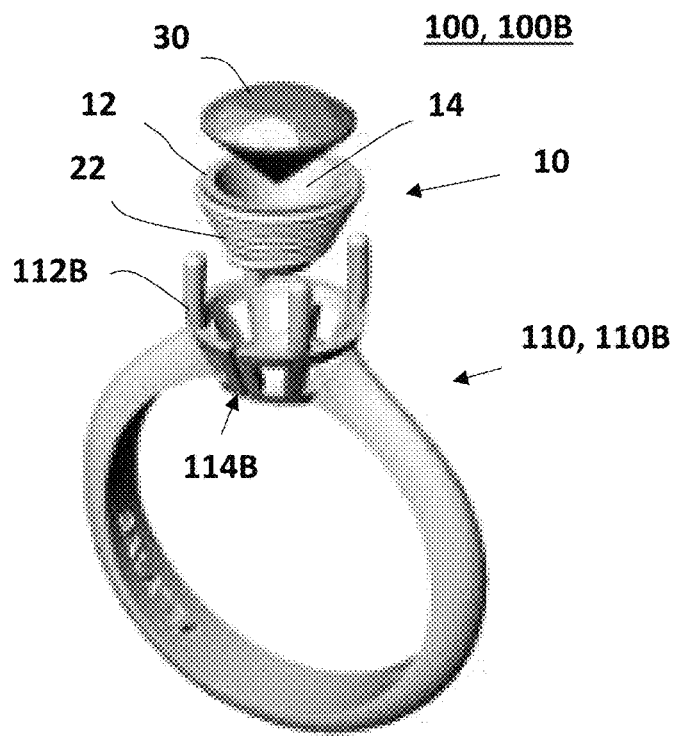

In addition, as shown in FIGS. 2A-B, by forming a separate jewelry head 10, a same jewelry head 10 can also be affixed to a different article of jewelry 110. In FIGS. 2A-B, a jewelry item 100 in the form of a ring 100B displaying a precious gem 30 embodied as a blue topaz is shown. The ring 110B includes a receiving member 112B configured to receive a same jewelry head 10 as provided in FIG. 1B, which itself is shaped to permit the recessed positioning of the gem 30.

Although the gem 30 is shown embodied as a blue topaz in FIGS. 1 and 2, the jewelry head 10 is suitable for use with a variety of precious and semi-precious gems 30. As further guidance, the term "precious gem" as used herein refers to a precious stone for ornamentation and term "semi-precious gem" as used herein refers to a semi-precious stone for ornamentation. A "semi-precious gem" is also intended to encompass an artificial gem or a replica of a precious gem. Preferably, the "precious gem" and "semi-precious gem" are cut and polished. Non-limiting examples of gems that may be used include an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

Figures 3A, 3B:
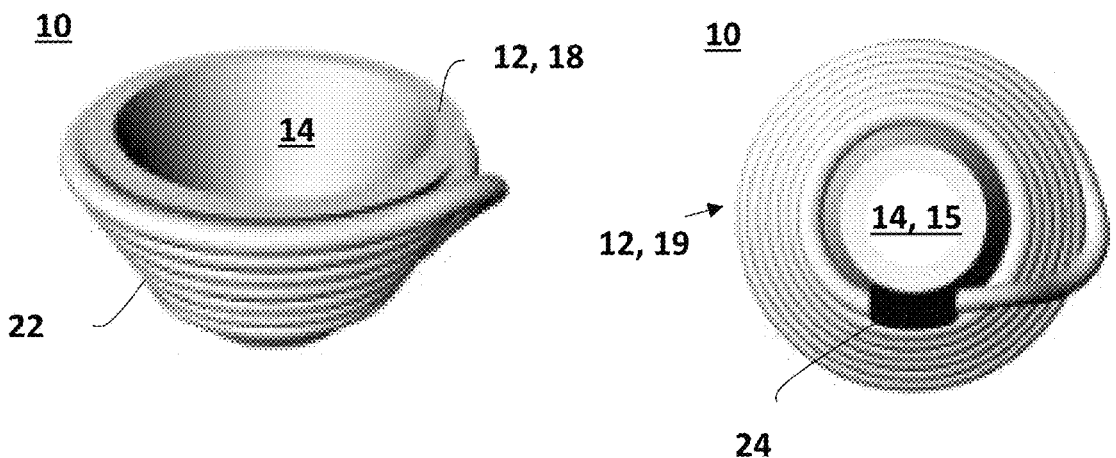
FIGS. 3A-D depict a jewelry head 10 having a ferrite body 12 with a tapered inner cavity 14; and a near field communication circuit 20 having a near field communication chip 24 electrically connected to an antenna 22, where the antenna 22 is wrapped around and against the ferrimagnetic body 12.

A shown more clearly in FIGS. 1B, 2B and 3A, the body 12 of the jewelry head 10 has an inner cavity 14 shaped to accept a precious or semi-precious gem 30. By "accept" it is mean that the gem 30 is partially recessed into the cavity 14 of the body 12. Preferably, the body 12 has an inner concave cavity 14, which can be tapered, thereby narrowing from top to bottom. This improves placement of the gem 30 within the cavity 14. The gem 30 is generally mounted to the head 10 by way of a jeweler's adhesive. The gem 30 can be mounted to the head 10 before or after affixing the jewelry head 10 to the article of jewelry 110.

Most preferably, the body 12 is defined by a continuous wall 18. By "continuous" is meant that the wall 18 forms a complete loop, such that there is no lengthwise end to the wall 18. The wall 18 can have any suitable pitch, such as absolute vertical (e.g. cylindrical), or offset vertically anywhere between 89 degrees pitched inward to 89 degrees pitched outward depending on the size of the jewelry head 10 and the intended gem 30. The wall 18 can have one or more corners along its length (e.g. inverted pyramid shape) or a lack a corner along its length, such as a cylinder or inverted cone-shaped (e.g. right circular cone or oblique circular cone). In some embodiments the inner cavity 14 has corners, but the outer wall 18 lacks corners. An outer wall 18 lacking corners along its length improves wrapping of the antenna 22. As shown in FIG. 3B, in some embodiments the body 12 is a tapered sleeve 19 and the cavity 14 in the form of a through bore 15 extends along the longitudinal axis of the body 12.

Moving to FIGS. 3A-D, near field communication is achieved at least in part by applying the near field communication antenna 22 of an NFC circuit 20 around and against the ferrimagnetic body 12. The antenna 22 can be applied by adhesive. In the present invention, the jewelry head 10 acts as a target to receive the field from an initiator, such as a smart phone having suitable NFC electronics and software.

The near field communication antenna 22 is electrically connected to an NFC chip 24 to form the NFC circuit 20. The term "near field communication chip" or "NFC chip" as used herein refers to an unpowered chip capable of acting as a passive target under near field communication standards as known in the electronic communication arts. Thus the NFC chip 24 draws its operating power from the initiator-provided electromagnetic field.

There are challenges that had to be overcome to adapt near field communication to the desired jewelry items. Among these include establishing near field communication despite using materials commonly used in the jewelry arts. Metals, such as sliver and gold conduct electricity, and it is known that an outer conductive loop of gold or silver on a same plane as a planar NFC antenna will interfere with the NFC antenna and chip.

In view of the above, U.S. Pat. No. 9,824,310 (the '310 patent) by the inventor of the present invention provides a configuration where the article of jewelry has a gap to avoid formation of an interfering conductive loop. As shown in FIGS. 1C and 2B, the jewelry items 100 (100A, 100B) disclosed herein can also have a gap 114A, 114B to prevent or reduce a conductive loop around the NFC antenna 22. However, avoiding interference is further improved by avoiding a planar antenna 22 configuration. By extending the height of the NFC antenna 22, it is believed that interference from the article of jewelry 110 can be further reduced.

In addition, while the configuration of the near filed communication circuit shown in the '310 patent is suitable for planar surfaces, such surfaces are absent in the configurations shown in FIGS. 1A-2B. That is, the jewelry head 10 of the present invention is not characterized by an outward extending disc to overlay the NFC antenna 22 substantially as provided in the '310 patent. To this end, the near field communication circuit 20 (FIG. 3D) required further miniaturization While minimizing the diameter of the NFC loop antenna 22 would be preferred, reducing the diameter of the NFC antenna 22 reduces the available communication range. A loop antenna 22 having a smaller diameter generally has a shorter range. Thus, deviating from a planar orientation tends to adversely affect induction.

Turning to FIGS. 1A-3D, a new form of jewelry head 10 has been developed, which permits narrowing the overall diameter of the NFC antenna 22 without substantial decreasing communication range. In particular, a jewelry head 10 has been developed having a continuous wall 18 with a near field communication antenna 22 spirally wrapping along a height of the wall 18. In some embodiments, at least 10% of the area of the outer wall 18 is wrapped. In some embodiments, at least 20% of the area of the outer wall 18 is wrapped. In some embodiments, at least 25% of the area of the outer wall 18 is wrapped. In some embodiments, at least 30% of the area of the outer wall 18 is wrapped. In some embodiments, at least 40% of the area of the outer wall 18 is wrapped. In some embodiments, at least 50% of the area of the outer wall 18 is wrapped. In some embodiments, at least 75% of the area of the outer wall 18 is wrapped. In some embodiments, at least 80% of the area of the outer wall 18 is wrapped. In some embodiments, at least 85% of the area of the outer wall 18 is wrapped. In some embodiments, at least 90% of the area of the outer wall 18 is wrapped. In some embodiments, at least 95% of the area of the outer wall 18 is wrapped. This approach alters the NFC antenna 22 from a conventional planar orientation to a nonplanar orientation. However, a challenge encountered when spirally wrapping an antenna 22 vertically is that the horizontal spread of the NFC antenna 22 is reduced. To this end, the horizontal distance of the available receiving NFC field is also reduced. This further challenge was overcome by forming the body 12 of the jewelry head 10 from ferrite. Ferrite is a type of ceramic compound with iron (III) oxide ($Fe_2O_3$) combined chemically with one or more additional metallic elements. They are both electrically nonconductive and ferrimagnetic, meaning they can be magnetized or attracted to a magnet. By coupling the near field antenna 22 to a continuous wall 18 of ferrite, the range of the near field communication chip 24 has been maintained and improved while also reducing the diameter of the loop antenna 22.

Figures 3C, 3D:
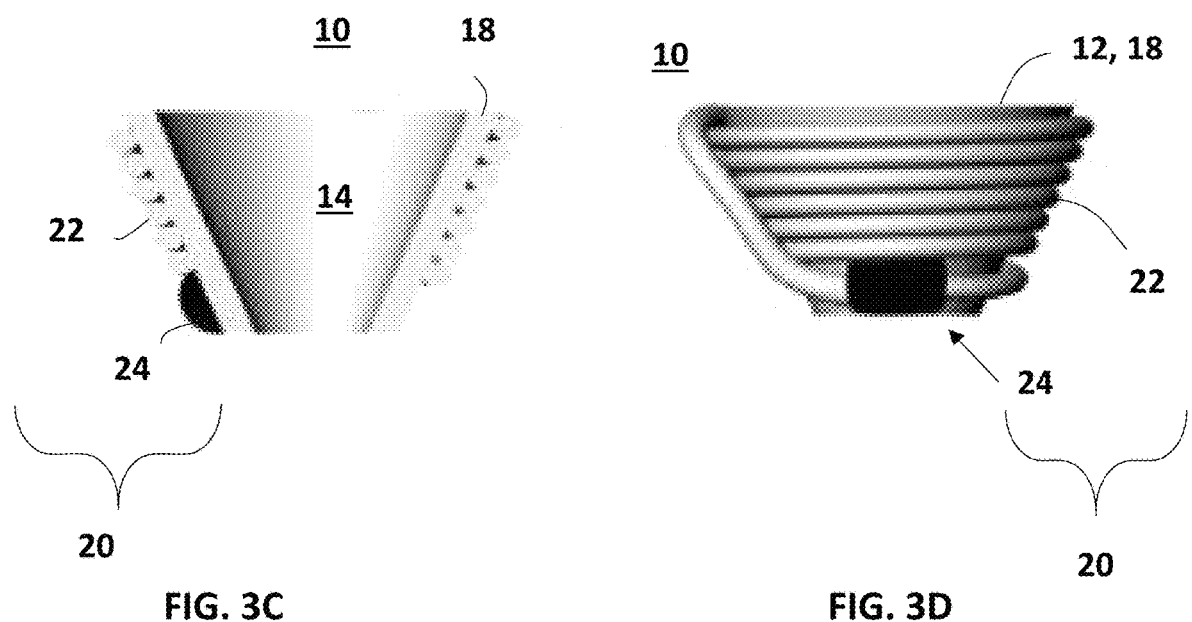

To this end, the jewelry head 10 can include a ferrite body 12 with an inner cavity 14 configured to accept a precious or semi-precious gem 30; and a near field communication circuit 20 having a near field communication chip 24 electrically connected to an antenna 22, where the antenna 22 is wrapped around and against the ferrimagnetic body 12, preferably about 15 revolutions around the body 12. At least partially recessing the gem 30 into the cavity 14 results in a continuous wall 18 surrounding that portion of the perimeter of the gem 30. Without being bound by theory, spirally wrapping the antenna 22 along a height of the ferrimagnetic body 12 is believed to improve signal. As shown in FIGS. 3C and 3D, the NFC chip 24 from the NFC circuit 20 can be placed along the outer circumference of the wall 18 or could be placed underneath the wall 18 or inside the cavity 14.

Without being bound by theory, it is believed that the ferrite body 12 does not itself act as the target during near field communication. Ferrite is not electrically conductive. Rather, the NFC antenna 22 receives the near field connection. However, it is believed that the ferrite assists with a magnetic field that attracts or helps maintain the wireless communication. Nonetheless, experimentally it has been found that use of a ferrite body 12 in the formation of a jewelry head 10 significantly increases the communication distance compared to a jewelry head 10 formed from a non-magnetic insulating material similarly wrapped with an NFC antenna 22.

Figure 4A:
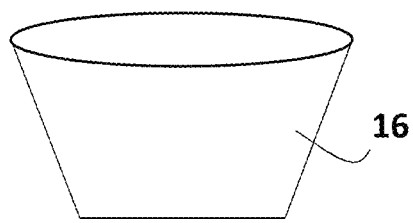
FIG. 4A depicts a jewelry head 10 coated with a protective outer layer 16.
Figure 4B:
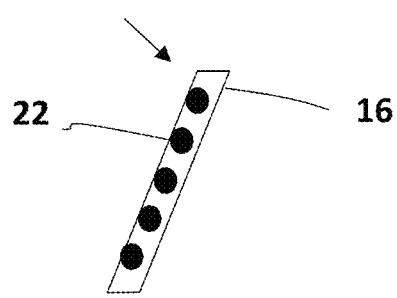
FIG. 4B depicts a cross section of a coated body 12 showing the outer layer 16 coating the antenna 22.

Finally, turning to FIGS. 4A-B, in some embodiments, the jewelry head 10 also has an electrically non-conductive outer layer 16 covering the near field communication antenna 22 and body 12. By providing the outer layer 16, the NFC antenna 22 can be further protected against abrasion and breakage. In addition, the outer layer 16 provides an improved surface for mounting to an article of jewelry 110. That is, by providing the outer layer 16 the NFC antenna 22 can be further protected against breakage during the mounting process, which can be by way of adhesive mounting or others depending on the chemistries of the outer layer 16 and article of jewelry 110. One of ordinary skill in the art to which the invention belongs would recognize that applying the outer layer 16 can be by way of a variety of techniques, such as spraying, dipping, gluing a precast layer, and others.

The invention described herein may be embodied in other specific forms without departing from the spirit or essential characteristics thereof. The specific embodiments previously described are therefor to be considered as illustrative of, and not limiting, the scope of the invention.

What is claimed is:

1. A jewelry head for mounting a precious or semi-precious gem to an article of jewelry, the jewelry head comprising a ferrimagnetic body comprising an inner cavity configured to accept a precious or semi-precious gem; and a near field communication circuit comprising a near field communication chip electrically connected to an antenna, wherein the antenna spirally wraps along an outside height of a wall of the ferrimagnetic body.

2. The jewelry head of claim 1, further comprising a gem mounted within the cavity, wherein the gem is selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

3. The jewelry head of claim 1, wherein the body is configured as a continuous wall.

4. The jewelry head of claim 1, wherein the body is configured as a tapered sleeve comprising a through bore along its longitudinal axis.

5. The jewelry head of claim 1, wherein the body is formed from ferrite.

6. The jewelry head of claim 1, further comprising an electrically non-conductive outer layer covering the near field communication circuit and body.

7. The jewelry head of claim 6, wherein the outer layer comprises a material selected from the group consisting of an epoxy, a ceramic, and a plastic.

8. The jewelry head of claim 1, further comprising a precious or semi-precious gem mounted in the cavity.

9. A jewelry item comprising the jewelry head of claim 1 affixed to an article of jewelry.

10. The jewelry item of claim 9, further comprising a precious or semi-precious gem mounted in the cavity.

11. The jewelry item of claim 10, wherein the gem is selected from the group consisting of an agate, an alexandrite, an amber, an ametrine, an amethyst, an aquamarine, an apatite, a beryl, a bloodstone, a chrysoberyl or cat-eye, a citrine, a corundum, a chalcedony, a chysocolla, a coral, a diamond, an emerald, a green beryl, a garnet, a quartz, an iolite, a jadcite, a kupzite, a lapis lazuli, a moonstone, a malachite, a moamite, an onyx, an opal, a pearl, a peridot, a red corundum, a ruby, a sardonyx, a sapphire, a spessartine, a sphene, a spinel, a star ruby, a sapphire, a sunstone, a tanzanite, a tiger eye, a tourmaline, a topaz, a turquoise, a tsavorite, a moissanite, and a zircon.

\* \* \* \* \*